(12) United States Patent
Bang et al.

(10) Patent No.: US 11,290,249 B2
(45) Date of Patent: Mar. 29, 2022

(54) METHOD FOR SUPPORTING TDD SCHEDULING IN WIRELESS LAN SYSTEM AND WIRELESS TERMINAL USING SAME

(71) Applicant: LG ELECTRONICS INC., Seoul (KR)

(72) Inventors: Saehee Bang, Seoul (KR); Jinmin Kim, Seoul (KR); Kiseon Ryu, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/959,107

(22) PCT Filed: Dec. 27, 2018

(86) PCT No.: PCT/KR2018/016748
§ 371 (c)(1),
(2) Date: Jun. 29, 2020

(87) PCT Pub. No.: WO2019/132538
PCT Pub. Date: Jul. 4, 2019

(65) Prior Publication Data
US 2020/0336279 A1    Oct. 22, 2020

Related U.S. Application Data

(60) Provisional application No. 62/610,524, filed on Dec. 27, 2017, provisional application No. 62/616,430, filed on Jan. 12, 2018.

(30) Foreign Application Priority Data

Mar. 20, 2018   (KR) ........................ 10-2018-0031945
Apr. 6, 2018    (KR) ........................ 10-2018-0040286
(Continued)

(51) Int. Cl.
*H04L 5/14*     (2006.01)
*H04W 72/04*    (2009.01)
*H04W 74/04*    (2009.01)

(52) U.S. Cl.
CPC ............ *H04L 5/143* (2013.01); *H04L 5/1438* (2013.01); *H04W 72/0446* (2013.01); *H04W 74/04* (2013.01)

(58) Field of Classification Search
None
See application file for complete search history.

(56) References Cited

U.S. PATENT DOCUMENTS

2012/0257585 A1   10/2012   Sydor
2015/0223075 A1   8/2015    Bashar et al.
(Continued)

OTHER PUBLICATIONS

Carlos Corderio, Intel Sep. 2017 doc.: IEEE 802.11-17/1323r2 (Year: 2017).*
(Continued)

*Primary Examiner* — Mansour Oveissi
(74) *Attorney, Agent, or Firm* — Lee, Hong, Degerman, Kang & Waimey PC

(57) ABSTRACT

A method for supporting TDD in a wireless LAN system of the present specification comprises the steps of: transmitting, by a first wireless terminal, a first frame including a first information element defining a structure of a TDD service period (SP) for TDD channel access, wherein the structure of the TDD SP includes a plurality of consecutive and adjacent TDD intervals, and each of the plurality of TDD intervals includes at least one TDD slot; and transmitting, by the first wireless terminal, a second frame including a second information element defining a schedule for TDD channel access of a second wireless terminal within the TDD SP, to the second wireless terminal, wherein the second information element includes: first information defining an operation (Continued)

type of each of a plurality of TDD slots included in at least one TDD interval for the second wireless terminal within the TDD SP; and second information associated with a duration to which the second information element is applied, and the plurality of TDD slots defined by the first information are repeated during the duration.

15 Claims, 14 Drawing Sheets

(30) Foreign Application Priority Data

| | | |
|---|---|---|
| Apr. 17, 2018 | (KR) | 10-2018-0044669 |
| May 8, 2018 | (KR) | 10-2018-0052527 |
| Jun. 14, 2018 | (KR) | 10-2018-0067973 |

(56) References Cited

U.S. PATENT DOCUMENTS

2019/0068255 A1* 2/2019 Bolotin ............ H04W 52/0225
2019/0222995 A1* 7/2019 Abouelseoud ........ H04W 8/005

OTHER PUBLICATIONS

Tujkovic, Djorde, et al., "Features for mmW Distribution Network Use Case", doc.: IEEE 802.11-17/1321r0, Sep. 2017, 24 pages.
Cordeiro, Carlos et al., "Draft Text for Scheduling for mmWave Distribution Networks", doc.: IEEE 802.11-17/1640r0, Nov. 2017, 10 pages.
Cherian, George et al., "Ack/BA for mmWave Distribution Networks", doc.: IEEE 802.11-17/16747r0, Nov. 2017, 14 pages.
PCT International Application No. PCT/KR2018/016748, International Search Report dated Apr. 2, 2019, 4 pages.

* cited by examiner (A)

(B)

METHOD FOR SUPPORTING TDD SCHEDULING IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2018/016748, filed on Dec. 27, 2018, which claims the benefit of earlier filing date and right of priority to U.S. Provisional Application No. 62/610,524, filed on Dec. 27, 2017, 62/616,430, filed on Jan. 12, 2018, and also claims the benefit of Korean Application Nos. 10-2018-0031945, filed on Mar. 20, 2018, 10-2018-0040286, filed on Apr. 6, 2018, 10-2018-0044669, filed on Apr. 17, 2018, and 10-2018-0052527, filed on May 8, 2018, and 10-2018-0067973, filed on Jun. 14, 2018, the contents of which are all incorporated by reference herein in their entireties.

BACKGROUND

Technical Field

The present disclosure relates to wireless communications, and more particularly, to a method for supporting TDD scheduling in a wireless LAN system and a wireless terminal using the same.

Related Art

Institute of Electrical and Electronics Engineers (IEEE) 802.11ad standard is an ultra-high speed wireless communication standard which is operating in a band of 60 GHz or more. The coverage range of signal is about 10 meters, but throughput of 6 Gbps or more can be supported. Since it operates in a high frequency band, a signal propagation such as ray-like propagation is dominate. A signal quality is improved as a transmit (TX) or receive (RX) antenna beam is arranged so as to head on a strong spatial signal path.

IEEE 802.11ad standard provides a beamforming training procedure for antenna beam arrangement. IEEE 802.11ay is a next generation standard which has been developed targeted to throughput of 20 Gbps or more.

SUMMARY

The present disclosure is to provide a method for supporting TDD scheduling in a wireless LAN system having improved performance and a wireless terminal using the same by reducing overhead of the repeated TDD slot assignment.

In an aspect of the present disclosure to solve the technical problem, a method for supporting time division duplex (TDD) in a wireless LAN system includes transmitting, by a first wireless terminal, a first frame including a first information element defining a structure of TDD service period (SP) for a TDD channel access, wherein the structure of the TDD SP includes multiple TDD intervals which are consecutive and adjacent, and wherein each of the multiple TDD intervals includes one or more TDD slots; and transmitting, by the first wireless terminal, a second frame including a second information element defining a schedule for the TDD channel access of a second wireless terminal within the TDD SP to the second wireless terminal, wherein the second information element includes first information for defining each of operation types of multiple TDD slots included in at least one TDD interval for the second wireless terminal within the TDD SP and second information associated with a duration that takes effect of the second information element, and wherein the multiple TDD slots defined by the first information is repeated during the duration.

According to an embodiment of the present disclosure, a method for supporting TDD scheduling in a wireless LAN system having improved performance and a wireless terminal using the same can be provided by reducing overhead of the repeated TDD slot assignment.

DESCRIPTION OF EXEMPLARY EMBODIMENTS

The above-described features and detailed description below are illustrated to aid in description and understanding of the disclosure. That is, the disclosure is not limited to such embodiments and may be embodied in different forms. The following embodiments are examples for thorough disclosure and explanation for delivering the disclosure to those skilled in the art. Therefore, when there are many methods for implementing components of the disclosure, it is necessary to make it clear that the disclosure can be realized through any of a specific one of these methods and a similar one.

When a certain component includes specific elements or a certain process includes specific steps in the disclosure, other elements or other steps may be further included. That is, the terms used in the disclosure are merely for describing particular embodiments, and are not intended to limit the scope of the disclosure. Furthermore, examples described for aiding in understanding of the present disclosure include complementary embodiments thereof.

All terms including technical or scientific terms have the same meanings as generally understood by a person having ordinary skill in the art to which the disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner. Hereinafter, embodiments of the disclosure will be described with reference to the attached drawings.

Figure 1:
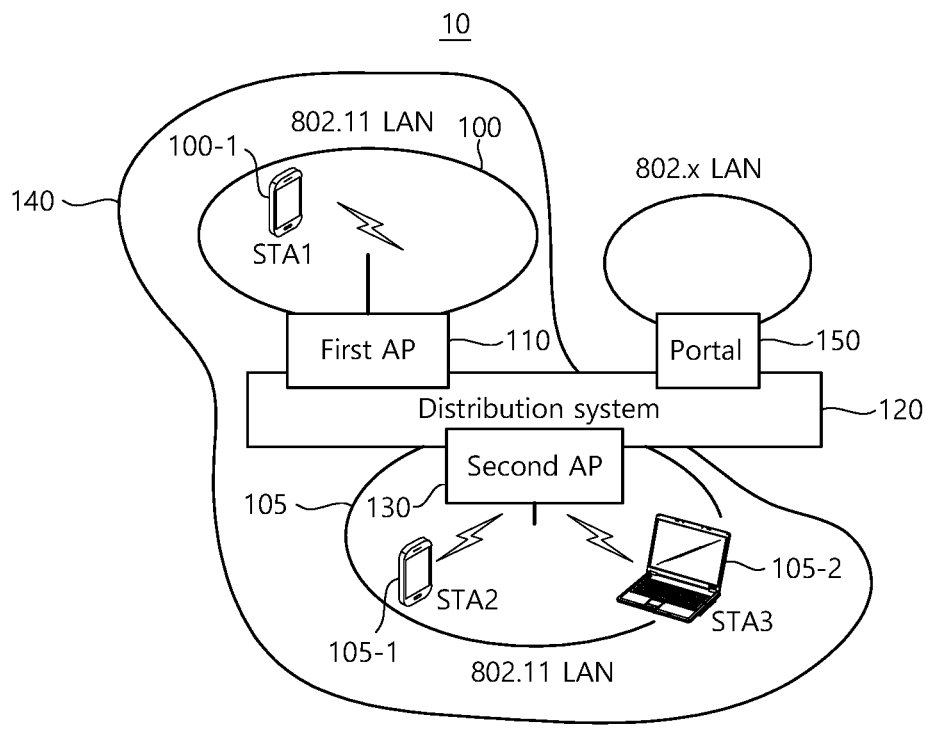
FIG. 1 is a conceptual diagram showing a structure of a wireless LAN system.
Figure 1:
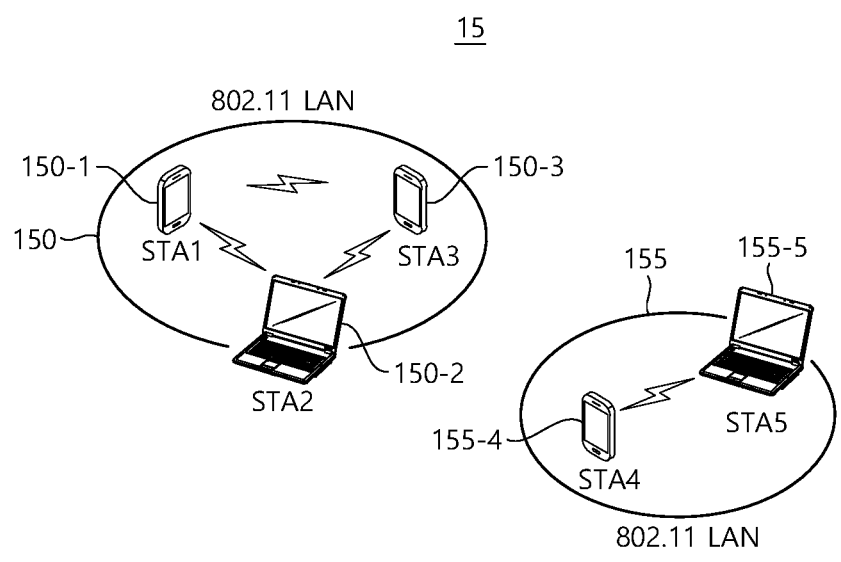

FIG. 1 is a conceptual diagram showing a structure of a wireless LAN system. FIG. 1(A) shows a structure of an infrastructure network of IEEE (Institute of Electrical and Electronic engineers) 802.11.

Referring to FIG. 1(A), the wireless system 10 shown in FIG. 1(a) may include at least one basic service set (BSS) 100 and 105. A BSS is a set of an access point (AP) and a station (STA) which can communication each other in successful synchronization with each other and does not refer to a specific area.

For example, a first BSS 100 may include a first AP 110 and a single first STA 100-1. A second BSS 105 may include a second AP 130 and one or more STAs 105-1 and 105-2.

The infrastructure BSSs 100 and 105 may include at least one STA, APs providing a distribution service, and a distribution system (DS) 120 which connects the APs.

The distribution system 120 can realize an extended service set (ESS) 140 by connecting the plurality of BSSs 100 and 105. The ESS 140 can be used as a term indicating a network realized by connecting one or more APs 110 and 130 through the distribution system 120. One or more APs included in the single ESS 140 may have the same service set identifier (SSID).

A portal 150 can serve as a bridge for connecting the wireless LAN network (IEEE 802.11) to another network (E.g., 802.X).

In the wireless LAN system having the structure shown in FIG. 1(A), a network between the APs 110 and 130 and a network between the APs 110 and 130 and the STAs 100-1, 105-1 and 105-2 can be realized.

FIG. 1(B) is a conceptual diagram showing an independent BSS. Referring to FIG. 1(B), a wireless LAN system 15 shown in FIG. 1(B) can establish a network between STAs without the APs 110 and 130 such that the STAs can perform communication, distinguished from the wireless LAN system of FIG. 1(A). A network established between STAs without the APs 110 and 130 for communication is defined as an ad-hoc network or an independent basic service set (IBSS).

Referring to FIG. 1(B), the IBSS 15 is a BSS operating in an ad-hoc mode. The IBSS does not have a centralized management entity because an APP is not included therein. Accordingly, STAs 150-1, 150-2, 150-3, 155-4 and 155-5 are managed in a distributed manner in the IBSS 15.

All STAs 150-1, 150-2, 150-3, 155-4 and 155-5 of the IBSS may be configured as mobile STAs and are not allowed to access a distributed system. All STAs of the IBSS constitutes a self-contained network.

An STA mentioned in the disclosure is an arbitrary functional medium including medium access control (MAC) conforming to regulations of IEEE (Institute of Electrical and Electronics Engineers) 802.11 and a physical layer interface with respect to a wireless medium and may be used as a meaning including both an AP and a non-AP station.

The STA mentioned in the disclosure may also be called various terms such as a mobile terminal, a wireless device, a wireless transmit/receive unit (WTRU), a user equipment (UE), a mobile station (MS), a mobile subscriber unit, and a user.

Figure 2:
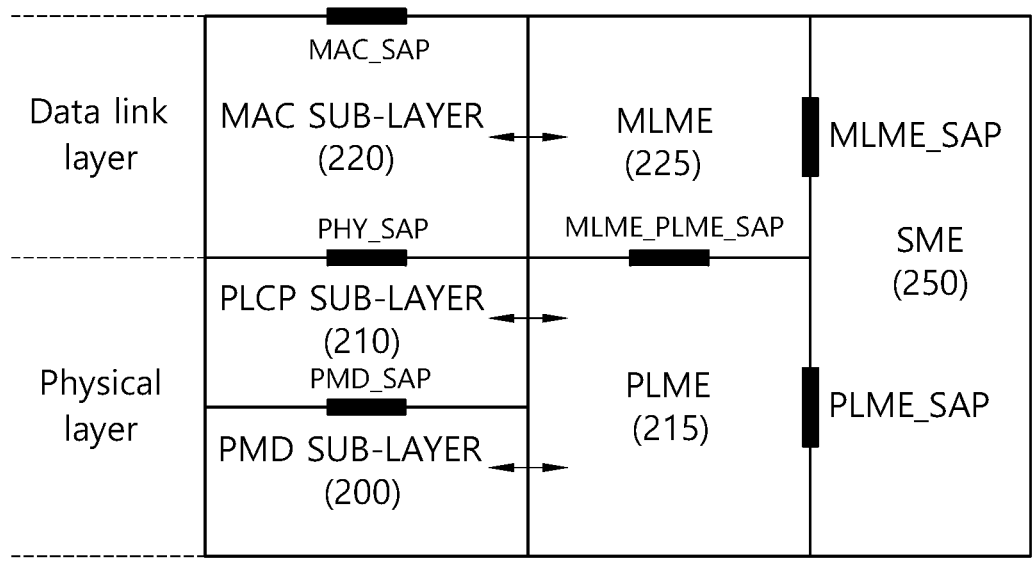
FIG. 2 is a conceptual diagram of a hierarchical architecture of a wireless LAN system supported by IEEE 802.11.

FIG. 2 is a conceptual diagram of a hierarchical architecture of a wireless LAN system supported by IEEE 802.11. Referring to FIG. 2, the hierarchical architecture of the wireless LAN system may include a physical medium dependent (PMD) sublayer 200, a physical layer convergence procedure (PLCP) sublayer 210 and a medium access control (MAC) sublayer 220.

The PMD sublayer 200 can serve as a transport interface for transmitting and receiving data between STAs. The PLCP sublayer 210 is implemented such that the MAC sublayer 220 can operate with minimum dependency on the PMD sublayer 200.

The PMD sublayer 200, the PLCP sublayer 210 and the MAC sublayer 220 may conceptually include a management entity. For example, a manager of the MAC sublayer 220 is called a MAC layer management entity (MLME) 225. A manager of the physical layer is called a PHY layer management entity (PLME) 215.

These managers can provide interfaces for performing layer management operation. For example, the PLME 215 can be connected to the MLME 225 to perform a management operation of the PLCP sublayer 210 and the PMD sublayer 200. The MLME 225 can be connected to the PLME 215 to perform a management operation of the MAC sublayer 220.

To perform correct MAC layer operation, an STA management entity (SME) 250 may be provided. The SME 250 can be operated as an independent component in each layer. The PLME 215, the MLME 225 and the SME 250 can transmit and receive information based on primitive.

The operation in each sublayer will be briefly described below. For example, the PLCP sublayer 210 transfers a MAC protocol data unit (MPDU) received from the MAC sublayer 220 to the PMD sublayer 200 or transfers a frame from the PMD sublayer 200 to the MAC sublayer 220 between the MAC sublayer 220 and the PMD sublayer 200 according to an instruction of the MAC layer.

The PMD sublayer 200 is a sublayer of PLCP and can perform data transmission and reception between STAs through a wireless medium. An MPDU transferred from the MAC sublayer 220 is referred to as a physical service data unit (PSDU) in the PLCP sublayer 210. Although the MPDU is similar to the PSDU, an individual MPDU may differ from an individual PSDU when an aggregated MPDU corresponding to an aggregation of a plurality of MPDU is transferred.

The PLCP sublayer 210 attaches an additional field including information necessary for a transceiver of the physical layer to a PSDU in a process of receiving the PSDU from the MAC sublayer 220 and transferring the PSDU to the PMD sublayer 200. Here, the attached field may be a PLCP preamble and a PLCT header attached to the PSDU, tail bits necessary to return a convolution encoder to a zero state, and the like.

The PLCP sublayer 210 attaches the aforementioned field to the PSDU to generate a PLCP protocol data unit (PPDU) and transmits the PPDU to a reception station through the PMD sublayer 200, and the reception station receives the PPDU and acquires information necessary for data restoration from the PLCP preamble and the PLCP header to restore data.

Figure 3:
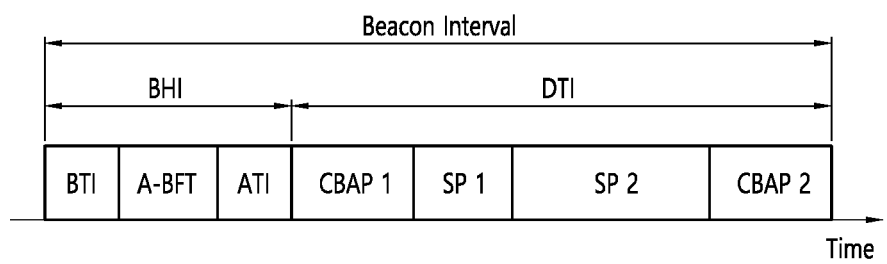
FIG. 3 is a diagram for describing an access period in a beacon interval.

FIG. 3 is a diagram for describing an access period in a beacon interval.

Referring to FIG. 3, a time of a wireless medium may be defined based on a beacon interval between a beacon frame and another beacon frame. For example, a beacon interval may be 1024 milliseconds.

Multiple lower periods in a beacon interval may be disclosed as an access period. Different access periods in a single beacon interval may have different access rules.

For example, information for an access period may be transmitted to a non-AP STA or a non-PCP by an AP or a Personal basic service set Control Point (PCP).

Referring to FIG. 3, a single beacon interval may include a Beacon Header Interval (hereinafter, 'BHI') and a Data Transfer Interval (hereinafter, 'DTI').

For example, a BHI may be a time period that starts from a target beacon transmission time (hereinafter, 'TBTT') and ends before a start of a DTI.

The BHI of FIG. 3 may include a Beacon Transmission Interval (hereinafter, 'BTI'), an Association Beamforming Training (hereinafter, 'A-BFT') and an Announcement Transmission Interval (hereinafter, 'ATI').

For example, a BTI may be a time period from a start of a first beacon frame to an end of a last beacon from, which is transmitted by a wireless terminal in a beacon interval. That is, a BTI may be a period during which one or more DMG beacon frame may be transmitted.

For example, an A-BFT may be a period during which a beamforming training is performed by an STA that transmits a DMG beacon frame during a preceding BTI.

For example, an ATI may be a management access period based on request-response between PCP/AP and non-PCP/non-AP STA. The Data Transfer Interval (hereinafter, 'DTI') of FIG. 3 may be a period during which a frame is exchanged among multiple STAs.

As shown in FIG. 3, one or more Contention Based Access Period (hereinafter, 'CBAP') and one or more Service Period (hereinafter, 'SP') may be allocated in a DTI.

A schedule of a DTI of a beacon interval may be communicated through an Extended Schedule element included in a beacon frame (or an announce frame). That is, the Extended Schedule element may include schedule information for defining multiple Allocations included in a beacon interval.

The detailed description for the beacon frame is disclosed through clause 9.4.2.132 of IEEE Draft P802.11-REVmc™/D8.0, August 2016 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' disclosed in August of 2016.

FIG. 3 shows an example that two CBAPs and two SPs are allocated for a single DTI. However, this is just exemplary, and it is understood that the present disclosure is not limited thereto.

Figure 4:
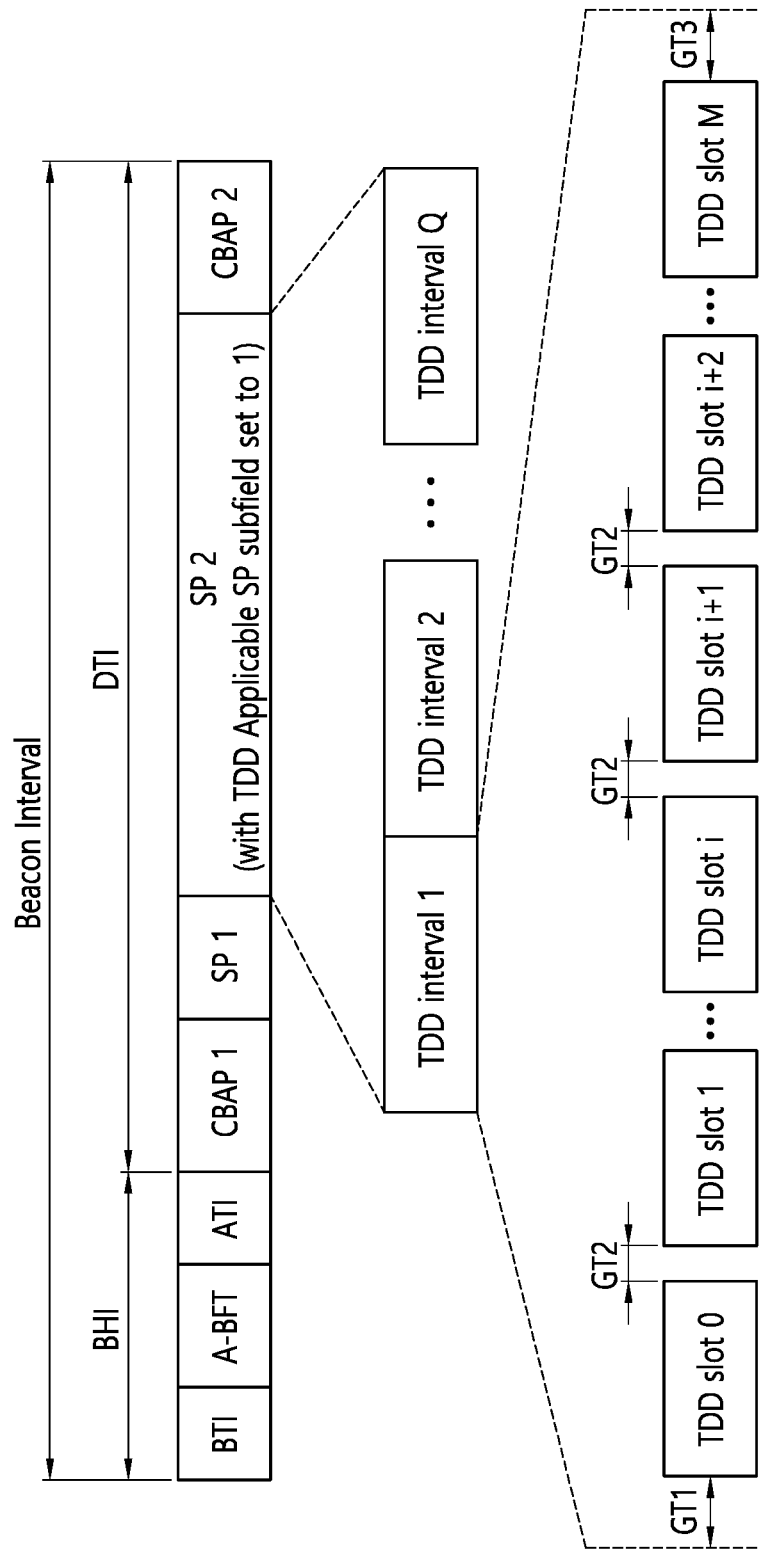
FIG. 4 is a conceptual diagram illustrating a structure of time division duplex (TDD) SP according to an embodiment.

FIG. 4 is a conceptual diagram illustrating a structure of time division duplex (TDD) SP according to an embodiment.

Referring to FIG. 1 to FIG. 4, among multiple allocation fields (not shown) included in the Extended Schedule element included in a beacon frame, an allocation field for a second service period SP2 of FIG. 4 may include a first sub-field and a second sub-field.

For example, the first sub-field included in the allocation field for the second service period SP2 of FIG. 4 may be configured with a value indicating SP allocation. In addition, the second sub-field included in the allocation field for the second service period SP2 of FIG. 4 may be configured with a value indicating that the second service period is TDD SP based on TDD channel access.

In the present disclosure, when information for TDD SP is included in the Extended Schedule element, the Extended Schedule element may be included in each beacon frame which is transmitted.

In addition, when the Extended Schedule element is transmitted once or more in a beacon interval, except for a special case, a content of the Extended Schedule element may not be changed.

Referring to FIG. 4, a structure of the second service period SP2 which is TDD SP may include multiple TDD interval 1 to TDD interval Q (Q is a natural number), which is consecutive and adjacent. As an example, the number of multiple TDD intervals of FIG. 4 may be Q.

Furthermore, each of multiple TDD intervals may include one or more TDD slots. For example, a first TDD interval (TDD interval 1) may include M+1 TDD slots (M is a natural number).

For example, a time interval from the start time of the first TDD interval (TDD interval 1) to a time before a start of the first TDD slot (i.e., TDD Slot 0) may be defined as a first guard time (hereinafter, GT1).

For example, a time interval between each of the TDD slots included in the first TDD interval (TDD interval 1) may be defined as a second guard time (GT2).

For example, a time interval from an end time of M+1th TDD slot (TDD slot M) to an end time of the first TDD interval (TDD interval 1) may be defined as a third guard time (GT3).

For example, each of the length of multiple TDD interval (TDD interval 1 to TDD interval Q) may be identical. A length of M+1 TDD slots (e.g., TDD slot 0 to TDD slot M of FIG. 4) included in a single TDD interval (e.g., TDD interval 1 of FIG. 4) may be different.

Referring to FIG. 4, a structure of one or more TDD slots included in the first TDD interval (TDD interval 1) may be repeatedly applied to the remaining TDD intervals (i.e., TDD interval 2 to TDD interval Q).

Figure 5:
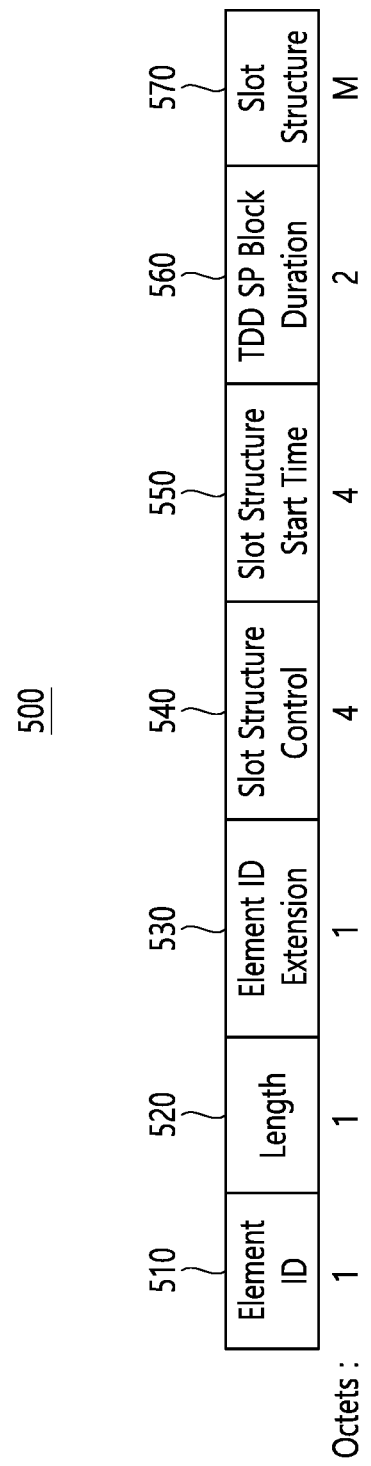
FIG. 5 is a diagram illustrating a format of TDD slot structure element defining TDD SP structure according to an embodiment.

FIG. 5 is a diagram illustrating a format of TDD slot structure element defining TDD SP structure according to an embodiment.

A TDD slot structure element 500 of FIG. 5 may define a structure of TDD SP in a beacon interval.

The TDD slot structure element 500 may be included in a beacon frame transmitted periodically by an AP. In this case, the beacon frame may be a frame according to broadcast technique. As an example, the beacon frame may be transmitted in the BTI of FIG. 4.

Referring to FIG. 5, the TDD slot structure element 500 may include multiple fields 510 to 570.

In an element ID field 510 of FIG. 5, a value for distinguishing the TDD slot structure element 500 may be configured.

In a length field 520 of FIG. 5, a value for indicating a length of the TDD slot structure element 500 may be configured.

In an element ID extension field 530 of FIG. 5, a value for distinguishing the TDD slot structure element 500 may be configured together with the element ID field 510.

A slot structure control field 540 of FIG. 5 may include additional control information for the TDD slot structure element 500. The slot structure control field 540 of FIG. 5 is described in detail with reference to FIG. 6 that will be described below.

A slot structure start time filed 550 of FIG. 5 may include information corresponding to lower 4 octets of a timing synchronization function (TSF) timer corresponding to a start time of the first TDD SP (e.g., start time of SP2 of FIG. 4) that applies the TDD slot structure element 500.

For example, parameter information for the TDD structure and parameter information for a guard time included in the TDD slot structure element 500 of FIG. 5 may be used for the TDD SP in the beacon interval.

In a TDD SP block duration field 560 of FIG. 5, a value for indicating a duration of a corresponding TDD SP may be configured. For example, the TDD SP block duration field 560 may include information corresponding to a total length of the second service period SP2 of FIG. 4.

A slot structure filed 570 of FIG. 5 may be a field for defining one or more TDD slots included in each TDD interval. The slot structure field 570 of FIG. 5 is described in detail with referent to FIG. 7 that will be described below.

Figure 6:
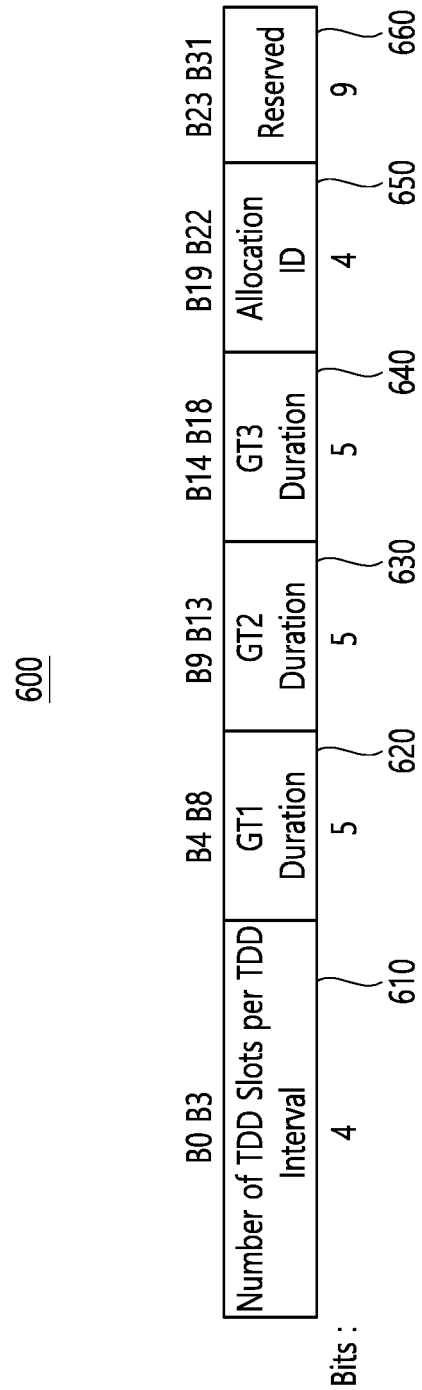
FIG. 6 is a diagram illustrating a format of the slot structure control field for the TDD slot structure element according to an embodiment.

FIG. 6 is a diagram illustrating a format of the slot structure control field for the TDD slot structure element according to an embodiment.

Referring to FIG. 4 to FIG. 6, slot structure control fields 540 and 600 for the TDD slot structure element 500 may include multiple sub-fields 610 to 660.

A sub-field 610 for the number of TDD slots per TDD interval may include information for the number of TDD slots (e.g., M for the case of FIG. 4) included in each TDD interval. In this case, the sub-field 610 for the number of TDD slots per TDD interval may be defined based on 4-bit (B0 to B4).

A GT1 duration sub-field 620 of FIG. 6 may include information for a duration of a first guard time (e.g., GT1 of FIG. 4).

A GT2 duration sub-field 630 of FIG. 6 may include information for a duration of a second guard time (e.g., GT2 of FIG. 4).

A GT3 duration sub-field 640 of FIG. 6 may include information for a duration of a third guard time (e.g., GT3 of FIG. 4).

In an allocation ID sub-field 650 of FIG. 6, information for identifying a TDD SP (e.g., SP2 of FIG. 4) may be configured among the information included in the Extended schedule element that defines a schedule of DTI of a beacon interval. The remaining 9-bit (B23 to B31) of FIG. 6 may be reserved.

Figure 7:
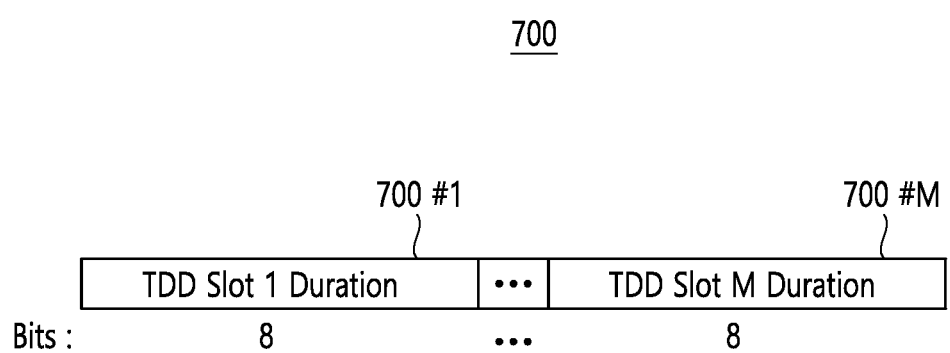
FIG. 7 is a diagram illustrating a format of a slot structure field of the TDD slot structure element according to an embodiment.

FIG. 7 is a diagram illustrating a format of a slot structure field of the TDD slot structure element according to an embodiment.

Referring to FIG. 4 to FIG. 7, slot structure fields 570 and 700 for the TDD slot structure element 500 may include first to $M^{th}$ TDD slot duration sub-fields 700 #1 to 700 #M.

Here, M may correspond to the value included in the sub-field 610 for the number of TDD slots per TDD interval of FIG. 6.

For example, an $i^{th}$ TDD slot duration sub-field (e.g., 1≤i≤M, i and M are natural numbers) may include information for duration of the $i^{th}$ TDD slot in each TDD interval.

Figure 8:
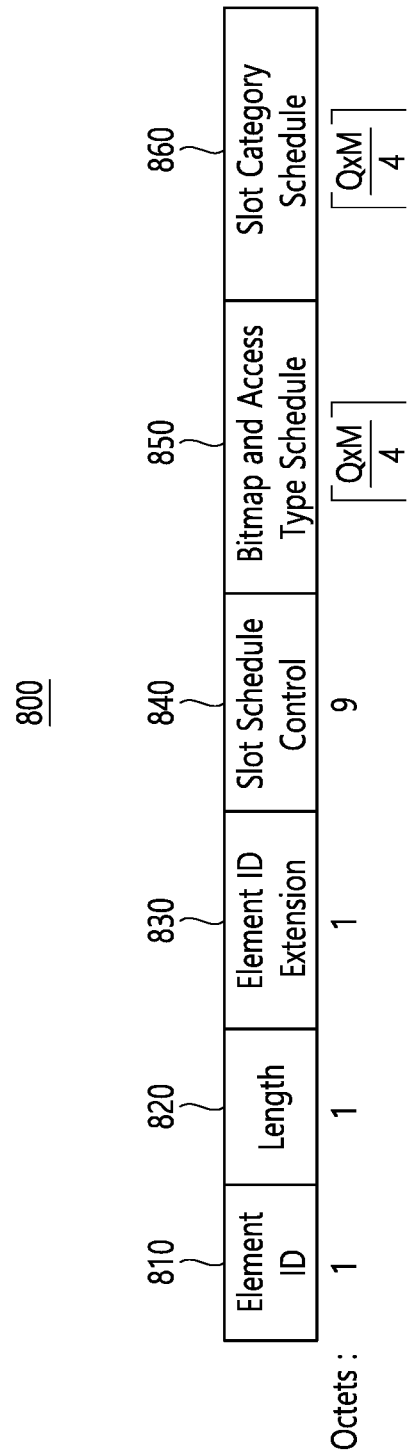
FIG. 8 a diagram illustrating a format of the TDD slot structure element defining a schedule for a TDD channel access according to an embodiment.

FIG. 8 a diagram illustrating a format of the TDD slot structure element defining a schedule for a TDD channel access according to an embodiment.

In the present disclosure, it is understood that the schedule for the TDD channel access may be referred as a TDD schedule.

A TDD slot schedule element 800 may define a schedule (i.e., TDD schedule) for a TDD channel access of a second wireless terminal specified in a TDD SP.

The TDD slot schedule element 800 may be transferred through an announce frame or an association response frame. For example, the announce frame or the association response frame may be a frame according to unicast technique. As an example, the announce frame or the association response frame may be transmitted in the ATI of FIG. 4.

Referring to FIG. 8, the TDD slot schedule element 800 may include multiple fields 810 to 860.

In an element ID field 810 of FIG. 8, a value for distinguishing the TDD slot schedule element 800 may be configured.

In a length field 820 of FIG. 8, a value for indicating a length of the TDD slot schedule element 800 may be configured.

In an element ID extension field 830 of FIG. 8, a value for identifying the TDD slot schedule element 800 may be configured with the element ID field 810.

A slot schedule control field 840 of FIG. 8 may include additional control information for the TDD slot schedule element 800. The slot schedule control field 840 of FIG. 8 is described in detail with reference to FIG. 9 that will be described below.

A bitmap and access type schedule field 850 of FIG. 8 may be associated with operation type information permitted in each of the multiple TDD slots included in at least one TDD interval for a wireless terminal that receives the TDD slot schedule element 800.

Here, the bitmap and access type schedule field 850 of FIG. 8 may be bitmap information having a length which is determined based on Equation 1 below.

$$\left\lceil \frac{Q \times M}{4} \right\rceil \qquad \text{[Equation 1]}$$

Herein, a length of the bitmap and access type schedule field 850 of FIG. 8 may be understood as a value of rounding up the multiplication of Q and M divided by 4.

As an example, Q of Equation 1 may be understood as the number of at least one TDD intervals after a start time when the TDD slot schedule element 800 for a wireless terminal is applied in a TDD SP.

As an example, M of Equation 1 may be understood as the number of at least one TDD slots included in each of the multiple TDD intervals of FIG. 4.

For example, each of the multiple TDD slots included in at least one TDD interval during which the TDD slot schedule element 800 is applied may correspond to each pair of consecutive 2 bits included in the bitmap and access type schedule field 850 of FIG. 8 sequentially.

Particularly, each pair of consecutive 2 bits included in the bitmap and access type schedule field 850 of FIG. 8 may be configured as any one of encoding values of Table 1 below.

TABLE 1

| | Operation between AP or PCP DMG STA and non-AP and PCP DMG STA during TDD slot | |
|---|---|---|
| Encoding | Behavior of AP and PCP STA | Behavior of Non-AP and non-PCP STA |
| 0 | N/A: TDD slot unassigned | |
| 1 | TX | RX |
| 2 | RX | TX |
| 3 | Unavailable | |

As an example, when the consecutive 2 bits included in the bitmap and access type schedule field 850 of Table 1 above indicate '0', a wireless terminal may understand a corresponding TDD slot as a TDD slot unassigned to the wireless terminal.

As an example, when the consecutive 2 bits included in the bitmap and access type schedule field 850 of Table 1 above indicate '1', a wireless terminal corresponding to a non-AP STA (or non-PCP STA) may understand a corresponding TDD slot as a TDD slot in which a reception operation is permitted.

As another example, when the consecutive 2 bits included in the bitmap and access type schedule field 850 of Table 1 above indicate '1', a wireless terminal corresponding to an AP STA (or PCP STA) may understand a corresponding TDD slot as a TDD slot in which a transmission operation is permitted.

As an example, when the consecutive 2 bits included in the bitmap and access type schedule field 850 of Table 1 above indicate '2', a wireless terminal corresponding to a non-AP STA (or non-PCP STA) may understand a corresponding TDD slot as a TDD slot in which a transmission operation is permitted.

As another example, when the consecutive 2 bits included in the bitmap and access type schedule field 850 of Table 1 above indicate '2', a wireless terminal corresponding to an AP STA (or PCP STA) may understand a corresponding TDD slot as a TDD slot in which a reception operation is permitted.

As an example, when the consecutive 2 bits included in the bitmap and access type schedule field 850 of Table 1 above indicate '3', a wireless terminal may understand a corresponding TDD slot as an unavailable TDD slot.

A slot category schedule filed 860 of FIG. 8 may be associated with category information of each of multiple TDD slots included in at least one TDD interval during which the TDD slot schedule element 800 is applied.

Here, the slot category schedule filed 860 of FIG. 8 may be bitmap information having a length which is determined based on Equation 1 above.

Particularly, each pair of consecutive 2 bits included in the slot category schedule filed 860 of FIG. 8 may corresponding to each pair of consecutive 2 bits included in the bitmap and access type schedule field 850.

In addition, each pair of consecutive 2 bits included in the slot category schedule filed 860 of FIG. 8 may indicate a type of allowed frame in a corresponding TDD slot.

For example, when 2 bits included in the slot category schedule filed 860 of FIG. 8 indicates '0', a corresponding TDD slot may be understood as a Basic TDD slot. In other words, in the Basic TDD slot, all types of frames may be transmitted.

For example, when 2 bits included in the slot category schedule filed 860 of FIG. 8 indicates '0', a corresponding TDD slot may be understood as a Data-only TDD slot. In other words, only data frame may be transmitted in the Data-only TDD slot.

Figure 9:
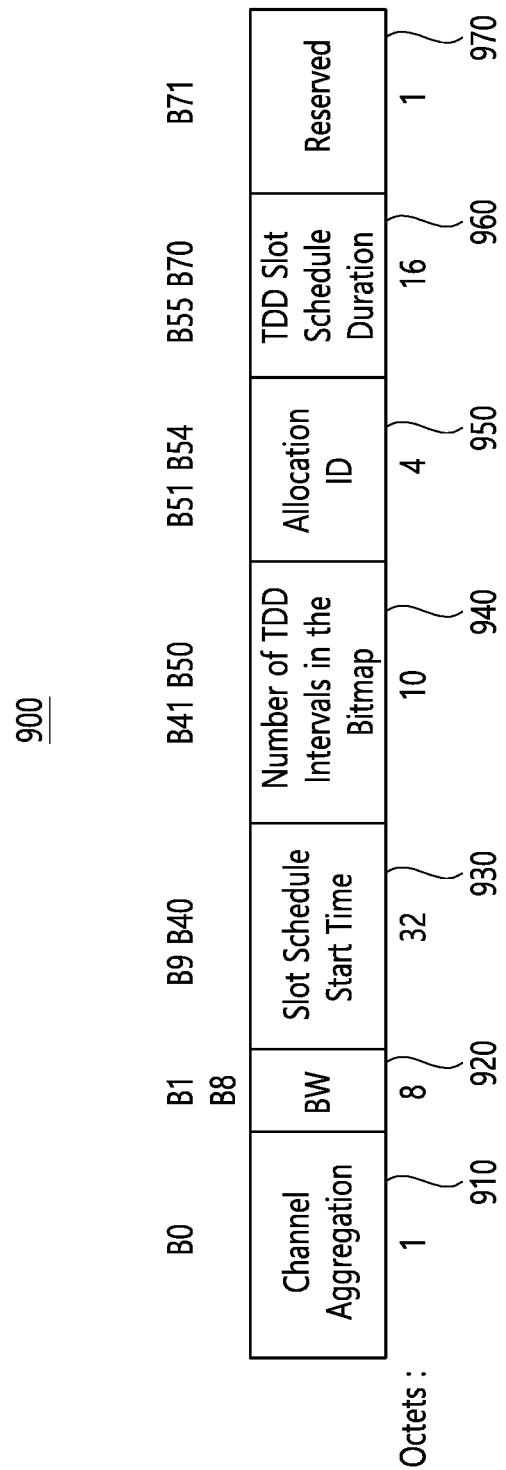
FIG. 9 is a diagram illustrating a format of a control field of a TDD slot schedule element according to an embodiment.

FIG. 9 is a diagram illustrating a format of a control field of a TDD slot schedule element according to an embodiment.

Referring to FIG. 4 to FIG. 9, slot schedule control fields 840 and 900 for the TDD slot schedule element 800 may include multiple sub-fields 910 to 970.

A channel aggregation sub-field 910 of FIG. 9 may include information for channel aggregation for a PPDU transmission.

A BW sub-field 920 of FIG. 9 may include information for channel bandwidth for a PPDU transmission may be included.

A slot schedule start time sub-field 930 of FIG. 9 may include information for lower 4 octets of a timing synchronization function (TSF) that corresponds to a start time of a first TDD interval (e.g., the start time of TDD interval 1 of FIG. 4) to which the TDD slot schedule element 800 for a wireless terminal is to be applied.

A sub-field for the number of TDD intervals in the bitmap 940 of FIG. 9 may include information for the number of at least one TDD interval after a start time indicated by the slot schedule start time sub-field 930 in a TDD SP.

An allocation ID sub-field 950 of FIG. 9 may include information for identifying a TDD SP (e.g., SP2 of FIG. 4) among the information included in the Extended schedule element that defines a schedule of a DTI of a beacon interval.

A TDD slot schedule duration sub-field 960 of FIG. 9 may include information associated with a duration for applying the TDD slot schedule element 800.

Here, the duration may correspond to a time period from a start of a first TDD interval for applying the TDD slot schedule element 800 to an end of a last TDD interval when the TDD slot schedule element 800 is expired.

For example, the bitmap information included in the bitmap and access type schedule field 850 may be repeated based on the TDD slot schedule duration sub-field 960.

For example, the TDD slot schedule duration sub-field 960 may be configured as an integer multiple Y of a time period that corresponds to at least one TDD interval in a TDD SP for a wireless terminal.

In this case, the bitmap information included in the bitmap and access type schedule field 850 may be repeated throughout the beacon interval that corresponds to the integer multiple Y.

For example, the bitmap information included in the slot category schedule filed 860 may be repeated based on the TDD slot schedule duration sub-field 960.

In the case, the bitmap information included in the slot category schedule filed 860 may be repeated throughout the beacon interval that corresponds to the integer multiple Y.

In the present disclosure, when a TDD schedule is repeated throughout the beacon interval, the bitmap information included in the bitmap and access type schedule field 850 and the bitmap information included in the slot category schedule filed 860 may be repeated throughout the beacon interval that corresponds to the integer multiple Y.

For example, in the case that a time conversion value of the TDD slot schedule duration sub-field 960 is identical to a time conversion value of the sub-field for the number of TDD intervals in the bitmap 940, the bitmap information 850 and 860 included in the TDD slot schedule element 800 may be allocated only to a current beacon interval without repetition.

For example, in the case that a time conversion value of the TDD slot schedule duration sub-field 960 is the integer multiple Y of the sub-field for the number of TDD intervals in the bitmap 940, the bitmap information 850 and 860 included in the TDD slot schedule element 800 may be repeated during a subsequent beacon interval as much as the integer multiple Y.

For reference, a last bit 970, B71 of the slot schedule control field 900 may be reserved.

Figure 10:
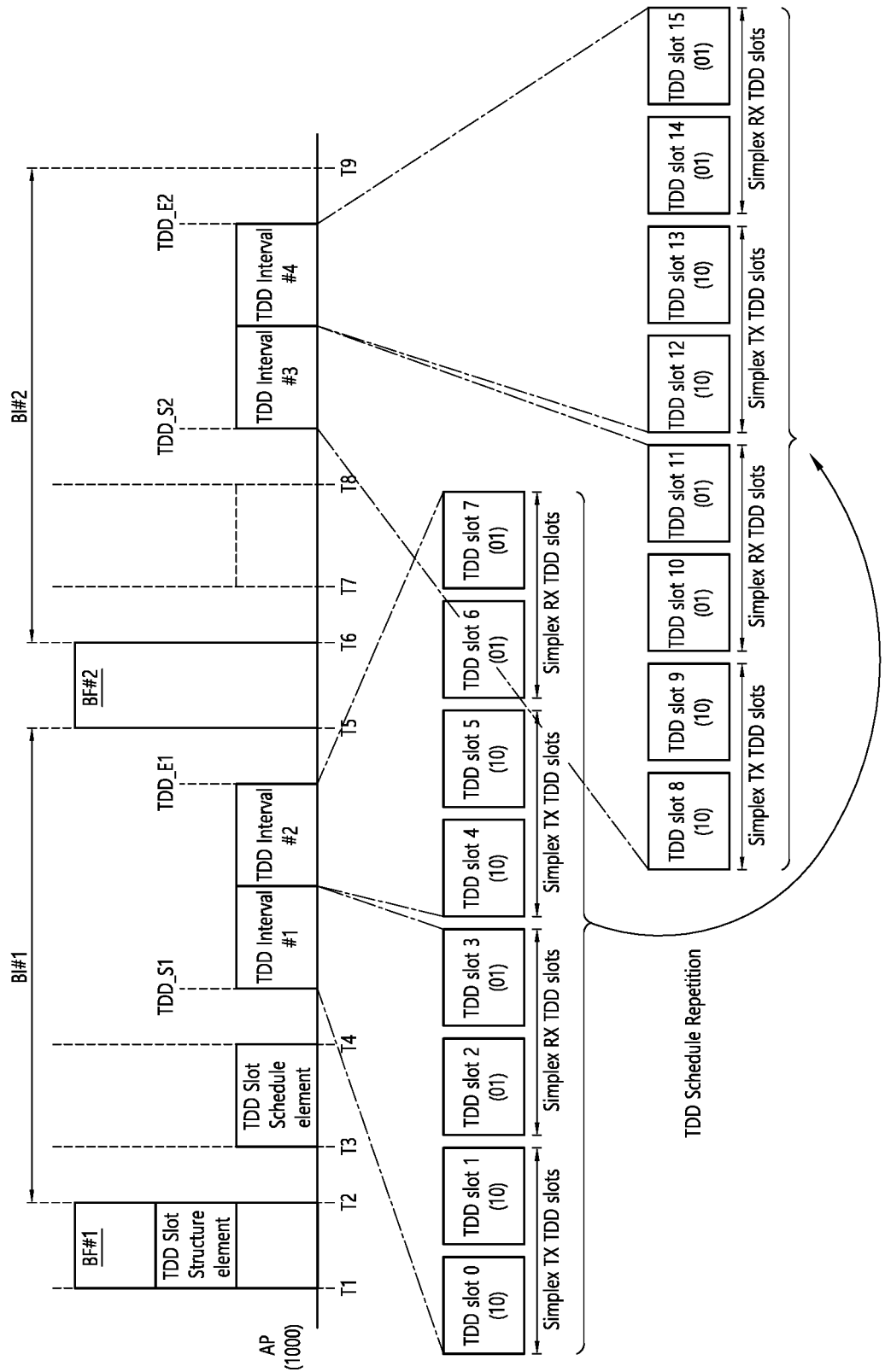
FIG. 10 is a conceptual diagram for describing a method for supporting TDD in a wireless LAN system according to an embodiment.

FIG. 10 is a conceptual diagram for describing a method for supporting TDD in a wireless LAN system according to an embodiment.

Referring to FIG. 1 to FIG. 10, the horizontal axis of an AP 1000 is a time axis and the vertical axis of the AP 1000 may be associated with a presence of a frame transmitted by the AP 1000. Referring to FIG. 10, the AP 1000 may transmit beacon frames BF #1 and BF #2 in each of beacon intervals BI #1 and BI #2.

It is understood that beacon frames BF #1 and BF #2 may be received by multiple STAs (not shown) located in a transmission distance of the AP 1000.

For clear and concise understanding of FIG. 10, it may be assumed that schedules of DTIs of each of the beacon frames BF #1 and BF #2 are identical. In other words, the content of the Extended Schedule Element (not shown) included in the first beacon frame BF #1 may be identical to the content of the Extended Schedule Element (not shown) included in the second beacon frame BF #2.

Accordingly, referring to FIG. 10, it is understood that an identical TDD SP (e.g., SP2 of FIG. 4) may be included in each of the beacon intervals BI #1 and BI #2.

In a first period T1 to T2 of FIG. 10, the AP 1000 may transmit the first beacon frame BF #1. In this case, the first beacon frame BF #1 may include the TDD slot structure element that defines a structure of TDD SP for a TDD channel access.

As an example, the first period T1 to T2 of FIG. 10 may be understood as a part of time period belonged to the BTI of FIG. 4.

In the present disclosure, in the case that a structure of TDD SP is changed, it is understood that a TDD slot structure element may be included in a beacon frame for signaling the changed structure of TDD SP to multiple STAs.

For example, the TDD slot structure element of FIG. 10 may include information (e.g., 610 of FIG. 6) for configuring the number of TDD slots for each TDD interval to '4'.

For example, the TDD slot structure element of FIG. 10 may include information (e.g., 550 of FIG. 5) for a start time (e.g., TDD_S1 of FIG. 10) to which the TDD slot structure element is applied.

For example, the TDD slot structure element of FIG. 10 may include information (e.g., 560 of FIG. 5) for a duration (e.g., TDD_S1 to TDD_E1 of FIG. 10) of the corresponding TDD SP.

For a brief description of FIG. 10, first to third guard times GT1 to GT3 associated with multiple TDD slots included in each of the intervals of FIG. 10 are not separately denoted in FIG. 10, but the contents therefor may be understood based on the contents of FIG. 4 above.

In addition, it is understood that the detailed description for the TDD slot structure element of FIG. 10 may be replaced based on the descriptions of FIG. 4 to FIG. 7.

A second period T2 to T3 of FIG. 10 may correspond to the A-BFT of FIG. 4 above.

In a third period T3 to T4 of FIG. 10, the AP 1000 may transmit a frame including a TDD slot schedule element for the first TDD SP (TDD_S1 to TDD_E1).

In this case, the TDD slot schedule element may include first information for defining each of operation types of multiple TDD slots included in at least one TDD interval and second information associated with a duration for applying a second information element for an STA within a TDD SP of FIG. 10.

As an example, the third period T3 to T4 of FIG. 10 may be understood as a part of time period belonged to the ATI of FIG. 4.

For example, the TDD slot schedule element may be transmitted according to unicast technique with being included in the Announce Frame or the association response frame.

Particularly, the conventional TDD slot schedule element may be transmitted to each STA for every TDD SP.

In other words, according to the conventional art, in the case that an STA is unable to receive a TDD slot schedule element to which at least one TDD slot for the STA except for a transmission of a TDD beamforming frame before association, the STA may not perform a transmission operation during a corresponding TDD SP.

The TDD slot structure element of FIG. 10 may include information (e.g., 930 of FIG. 9) for a start time (not shown) to which the TDD slot structure element is applied. For example, the start time to which the TDD slot structure element is applied may be a time when the first guard time GT1 is further lapsed after TDD_S1 of FIG. 10.

For example, different from that shown in FIG. 10, a start time (not shown) to which the TDD slot structure element is applied may be configured as a start time of a subsequent TDD interval (e.g., TDD interval #2 of FIG. 10), not the forefront TDD interval of a TDD SP.

The TDD slot structure element of FIG. 10 may include information (e.g., 940 of FIG. 9) for the number of TDD intervals (e.g., '2' of FIG. 10) next to the start time to which the TDD slot structure element is applied within a TDD SP.

The TDD slot structure element of FIG. 10 may include information (e.g., 850 of FIG. 8) for each of operation types of multiple TDD slots included in at least one TDD interval for an STA.

For example, the information (e.g., 850 of FIG. 8) for each of operation types of multiple TDD slots (e.g., TDD slot 0 to TDD slot 7 of FIG. 10) of FIG. 10 may be represented by a unit of consecutive 2-bit.

That is, the information (e.g., 850 of FIG. 8) for each of operation types of first to eighth TDD slots (TDD slot 0 to TDD slot 7) may be represented based on Equation 1 and Table 1.

In the case of FIG. 10, the information (e.g., 850 of FIG. 8) for each of operation types of first to eighth TDD slots (TDD slot 0 to TDD slot 7) may be 10 10 01 01 10 10 01 01 having a length of total 16 bits.

The TDD slot structure element of FIG. 10 may include information (e.g., 960 of FIG. 9) associated with a duration for applying the TDD slot structure element.

For clear and brief description of FIG. 10, it may be assumed that a value corresponding to twice of a time conversion value of the sub-field (e.g., 940 of FIG. 9) for the number of TDD intervals in a bitmap may be configured to the information (e.g., 960 of FIG. 9) associated with a duration for applying the TDD slot structure element.

According to the assumption, the information (e.g., 960 of FIG. 9) associated with a duration for applying the TDD slot structure element may include information corresponding to a summation of a duration of the first and second TDD intervals (TDD Interval #1 and TDD Interval #2) of FIG. 10 and a duration of the third and fourth TDD intervals (TDD Interval #3 and TDD Interval #4).

It is understood that the detailed description for the TDD slot structure element of FIG. 10 may be replaced based on the descriptions of FIG. 4, FIG. 8 and FIG. 9 above.

In the fourth period T4 to T5 of FIG. 5, the first TDD SP (TDD_S1 to TDD_E1) of FIG. 10 may be defined based on a TDD slot structure element of the first period T1 to T2 and a TDD slot structure element of the third period T3 to T4.

For example, the first TDD SP (TDD_S1 to TDD_E1) of FIG. 10 may include two TDD intervals (TDD interval #1 and TDD interval #2). In addition, each TDD interval may include four TDD slots.

For example, the first TDD interval (TDD interval #1) of FIG. 10 may include first to fourth TDD slots (TDD slot 0 to TDD slot 3).

In this case, operation types of the first and second TDD slots (TDD slot 0 and TDD slot 1) of FIG. 10 may be configured as TX of Table 1. In this case, operation types of the third and fourth TDD slots (TDD slot 2 and TDD slot 3) of FIG. 10 may be configured as RX of Table 1.

For example, the second TDD interval (TDD interval #2) of FIG. 10 may include fifth to eighth TDD slots (TDD slot 4 to TDD slot 7).

In this case, operation types of the fifth and sixth TDD slots (TDD slot 4 and TDD slot 5) of FIG. 10 may be configured as TX of Table 1. In this case, operation types of the seventh and eighth TDD slots (TDD slot 6 and TDD slot 7) of FIG. 10 may be configured as RX of Table 1.

In a fifth period T5 to T6 of FIG. 10, the AP 1000 may transmit the second beacon frame BF #2.

Referring to FIG. 10, in the second beacon frame BF #2, a TDD slot structure element for defining a structure of TDD SP for TDD channel access may not be included. In this case, the structure of the first TDD SP (TDD_S1 to TDD_E1 of FIG. 10) included in the first beacon interval BP #1 may be applied to the second TDD SP (TDD_S2 to TDD_E2 of FIG. 10) included in the second beacon interval BI #2 without any change.

A sixth period T6 to T7 of FIG. 10 may correspond to the A-BFT of FIG. 4 above.

In a seventh period T7 to T8 of FIG. 10, the AP 1000 may not transmit a frame including the TDD slot structure element for the second TDD SP (TDD_S2 to TDD_E2).

According to an embodiment, information for each of operation types of the first to eighth TDD slots (TDD slot 0 to TDD slot 7) may be repeated in the second TDD SP (TDD_S2 to TDD_E2 of FIG. 10) of the second beacon interval BI #2.

That is, the information ('10 10 01 01 10 10 01 01') for each of operation types of the first to eighth TDD slots (TDD slot 0 to TDD slot 7) may be repeated as information (e.g., 850 of FIG. 8) for each of operation types of multiple TDD slots (e.g., TDD slot 8 to TDD slot 15 of FIG. 10) for the second TDD SP (TDD_S2 to TDD_E2 of FIG. 10).

For example, a third TDD interval (TDD interval #3) may include ninth to twelfth TDD slots (TDD slot 8 to TDD slot 11).

In this case, operation types of the ninth and tenth TDD slots (TDD slot 8 and TDD slot 9) may be configured as TX of Table 1. In this case, operation types of the eleventh and twelfth TDD slots (TDD slot 10 and TDD slot 11) may be configured as RX of Table 1.

For example, a fourth TDD interval TDD (interval #4) may include thirteenth to sixteenth TDD slots (TDD slot 12 to TDD slot 15).

In this case, operation types of the thirteenth and fourteenth TDD slots (TDD slot 12 and TDD slot 13) may be configured as TX of Table 1. In this case, operation types of the fifteenth and sixteenth TDD slots (TDD slot 14 and TDD slot 15) may be configured as RX of Table 1.

Figure 11:
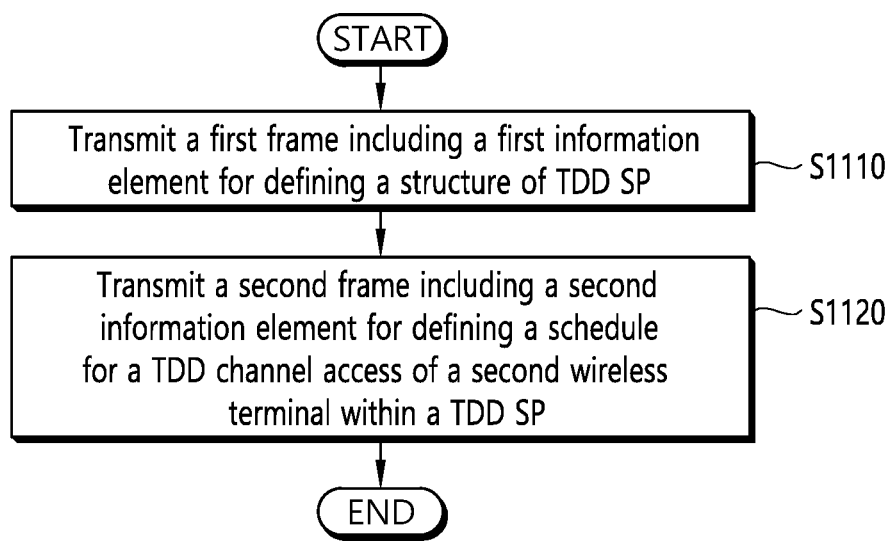
FIG. 11 is a flowchart for a method for supporting TDD in a wireless LAN system according to an embodiment.

According to an embodiment, overhead due to repeated TDD slot allocation may be reduced, and it may be provided a wireless LAN system having an improved performance in an aspect of overhead FIG. 11 is a flowchart for a method for supporting TDD in a wireless LAN system according to an embodiment.

In step S1110, a first wireless terminal may transmit a first frame including a first information element for defining a structure of TDD service period (SP) for a TDD channel access.

For example, the structure of TDD SP may include consecutive and adjacent multiple TDD intervals. In addition, each of the multiple TDD intervals may include one or more TDD slots.

For example, the first frame may be a beacon frame which is periodically transmitted in every beacon interval by an AP. For example, the first information element may be included in the beacon frame only in the case that the structure of TDD SP is changed.

In other words, in the case that first information element is not included in a beacon frame, each TDD SP in a corresponding beacon interval may have identical TDD SP structure.

For example, a beacon frame may be transmitted to multiple STAs with broadcast technique.

In step S1120, the first wireless terminal may transmit a second frame including a second information element for defining a schedule for a TDD channel access of a second wireless terminal within a TDD SP.

For example, the second information element may include first information for defining each of operation types of multiple TDD slots included in at least one TDD interval for the second wireless terminal within a TDD SP and second information associated with a duration that takes effect of the second information element.

For example, the multiple TDD slots defined by the first information may be repeated during the duration. That is, the TDD schedule for multiple TDD slots may be repeated throughout a beacon interval of an integer multiple that corresponds to the duration.

In this case, the duration may correspond to a time period from a start of a first TDD interval for taking effect of the second information element to an end of a last TDD interval when the second information element is expired.

Particularly, the second information may be configured as an integer multiple Y of the time period that corresponds to at least one TDD interval for the second wireless terminal within a TDD SP. In this case, the first information may be repeated throughout a beacon interval corresponding to the integer multiple Y.

Here, the at least one TDD interval may be understood as TDD intervals next to a start time (e.g., 930) for applying the second information element among multiple TDD intervals included in a single TDD SP.

For example, a beacon interval may mean a time interval between a beacon frame and a subsequent beacon interval.

Furthermore, the second information element may further include third information for a type of frame permitted in each of multiple TDD slots for the second wireless terminal.

For example, as shown in FIG. 10, it may be assumed that a value corresponding to twice of the time conversion value of the sub-field (e.g., 940 of FIG. 9) for the number of TDD intervals in the bitmap may be configured in the second information (e.g., 960 of FIG. 9) associated with the duration.

In this case, it is understood that the first information (e.g., 850 of FIG. 8) that defines each of operation types of multiple TDD slots for the second wireless terminal may be repeated during two beacon intervals.

For example, the first information may be configured based on any one of first to fourth types.

As an example, when a first type is configured to the first information, a TX operation of the second wireless terminal may be allowed in a corresponding TDD slot. As an example, when a second type is configured to the first information, an RX operation of the second wireless terminal may be allowed in a corresponding TDD slot.

As an example, when a third type is configured to the first information, a corresponding TDD slot may be unassigned. As an example, when a fourth type is configured to the first information, a corresponding TDD slot may be unavailable.

For example, the second information element may be transmitted with unicast technique within a beacon interval.

According to an embodiment, a TDD slot schedule element is not required to be transmitted to each of multiple STAs in each TDD slot, and overhead due to a repeated TDD slot allocation may be reduced. Therefore, it may be provided a wireless LAN system having an improved performance in an aspect of overhead.

Figure 12:
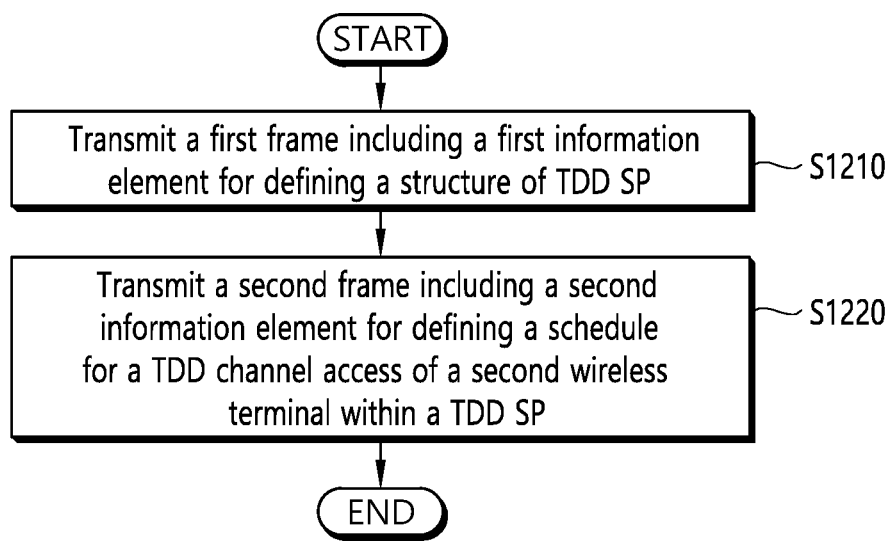
FIG. 12 is a flowchart for a method for supporting TDD in a wireless LAN system according to another embodiment.

FIG. 12 is a flowchart for a method for supporting TDD in a wireless LAN system according to another embodiment.

In step S1210, a first wireless terminal may transmit a first frame including a first information element for defining a structure of TDD service period (SP) for a TDD channel access.

In this case, the first wireless terminal may adopt the structure of TDD SP based on the first information element.

For example, the structure of TDD SP may include consecutive and adjacent multiple TDD intervals. In addition, each of the multiple TDD intervals may include one or more TDD slots.

For example, the first frame may be a beacon frame which is periodically transmitted in every beacon interval by an AP. For example, the first information element may be included in the beacon frame only in the case that the structure of TDD SP is changed. For example, a beacon frame may be transmitted to multiple STAs with broadcast technique.

In step S1220, the first wireless terminal may transmit a second frame including a second information element for defining a schedule for a TDD channel access of the first wireless terminal within a TDD SP.

For example, the second information element may include first information for defining each of operation types of multiple TDD slots included in at least one TDD interval for the second wireless terminal within a TDD SP and second information associated with a duration that takes effect of the second information element.

For example, the first information may be repeated during the duration.

In this case, the duration may correspond to a time period from a start of a first TDD interval for taking effect of the second information element to an end of a last TDD interval when the second information element is expired.

Particularly, the second information may be configured as an integer multiple Y of the time period that corresponds to at least one TDD interval for the second wireless terminal within a TDD SP. In this case, the first information may be repeated throughout a beacon interval corresponding to the integer multiple Y.

For example, a beacon interval may mean a time interval between a beacon frame and a subsequent beacon interval.

Furthermore, the second information element may further include third information for a type of frame permitted in each of multiple TDD slots for the second wireless terminal.

For example, the TDD schedule information for multiple TDD slots defined by the first information may be information repeated throughout at least one beacon interval based on the second information.

For example, the first information may be configured based on any one of first to fourth types.

As an example, when a first type is configured to the first information, a TX operation of the second wireless terminal may be allowed in a corresponding TDD slot. As an example, when a second type is configured to the first information, an RX operation of the second wireless terminal may be allowed in a corresponding TDD slot.

As an example, when a third type is configured to the first information, a corresponding TDD slot may be unassigned. As an example, when a fourth type is configured to the first information, a corresponding TDD slot may be unavailable.

For example, the second information element may be transmitted with unicast technique within a beacon interval which is a time interval between the first frame and the subsequent beacon frame.

According to an embodiment, a TDD slot schedule element for each TDD SP is not required to be transmitted to each STA, and overhead due to a repeated TDD slot allocation may be reduced. Therefore, it may be provided a wireless LAN system having an improved performance in an aspect of overhead.

Figure 13:
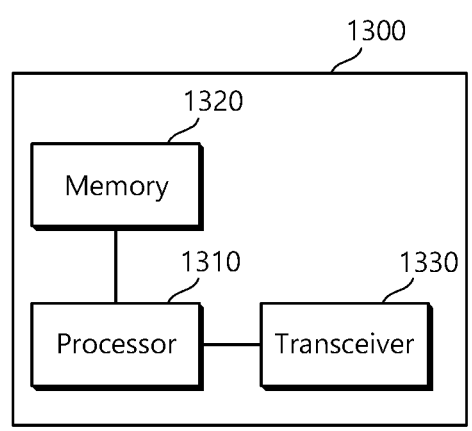
FIG. 13 is a block diagram illustrating a wireless device to which the embodiment may be applied.

FIG. 13 is a block diagram illustrating a wireless device to which the embodiment may be applied.

Referring to FIG. 13, a wireless device may be an STA that may implement the embodiment described above and operated as an AP or a non-AP STA. In addition, the wireless device may correspond to a user described above or a transmission terminal that transmits a signal to a user.

The wireless device of FIG. 13 includes a processor 1310, a memory 1320 and a transceiver 1330 as shown in the drawing. The processor 1310, the memory 1320 and the transceiver 1330 may be implemented with a separate chip, or at least two or more blocks/functions may be implemented with a single chip.

The transceiver 1330 is a device including a transmitter and a receiver. In the case that a specific operation is performed, either one operation of the transmitter or receiver may be performed, or both the operations of the transmitter and receiver may be performed.

The transceiver 1330 may include one or more antennas that transmit and/or receive a wireless signal. In addition, the transceiver 1330 may include an amplifier for amplifying a reception signal and/or a transmission signal and a band pass filter for transmitting on a specific frequency band.

The processor 1310 may implement the proposed function, procedure and/or method proposed in the present disclosure. For example, the processor 1310 may perform the operation according to the embodiment described above. That is, the processor 1310 may perform the operation described in the embodiments of FIG. 1 to FIG. 12.

The processor 1310 may include an application-specific integrated circuit (ASIC), other chipset, a logical circuit, a data processing device and/or a transformer that transforms a baseband signal and a wireless signal with each other.

The memory 1320 may include read-only memory (ROM), random access memory (RAM), flash memory, memory card, storage medium and/or other storage device.

Figure 14:
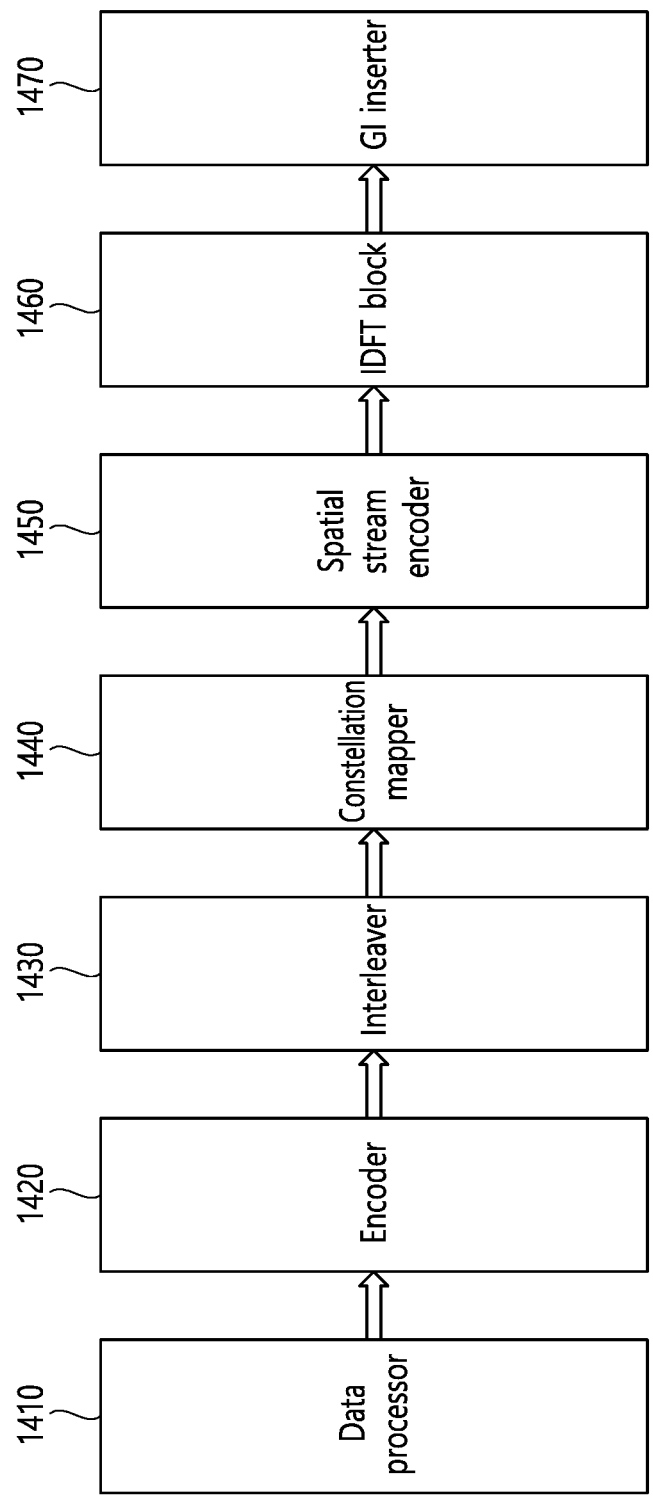
FIG. 14 is a block diagram illustrating an example of a device included in a processor.

FIG. 14 is a block diagram illustrating an example of a device included in a processor.

For the convenience of description, an example of FIG. 14 is described based on a block for a transmission signal, but it is apparent that a reception signal may be processed using the corresponding block.

A data processor 1410, which is shown, generates transmission data (control data and/or user data) corresponding to a transmission signal. An output of the data processor 1410 may be input to an encoder 1420. The encoder 1420 may perform coding using BCC (binary convolutional code) or LDPC (low-density parity-check) technique. At least one encoder 1420 may be included, and the number of encoders 1420 may be determined by various types of information (e.g., the number of data streams).

An output of the encoder 1420 may be input to an interleaver 1430. The interleaver 1430 performs an operation of distributing consecutive bit signals on a radio resource (e.g., time and/or frequency) to prevent a burst error owing to fading. At least one interleaver 1430 may be included, and the number of interleavers 1430 may be determined by various types of information (e.g., the number of spatial streams).

An output of the interleaver 1430 may be input to a constellation mapper 1440. The constellation mapper 1440 may perform a constellation mapping such as BPSK (bi-phase shift keying), QPSK (Quadrature Phase Shift Keying), n-QAM (quadrature amplitude modulation), and the like.

An output of the constellation mapper 1440 may be input to a spatial stream encoder 1450. The spatial stream encoder 1450 performs a data processing for transmitting a transmission signal through at least one spatial stream. For example, the spatial stream encoder 1450 may perform at least one of STBC (space-time block coding), CSD (Cyclic shift diversity) insertion and spatial mapping.

An output of the spatial stream encoder 1450 may be input to an IDFT 1460. The IDFT 1460 block performs IDFT (inverse discrete Fourier transform) or IFFT (inverse Fast Fourier transform).

An output of the IDFT 1460 is input to a GI (Guard Interval) inserter 1470, and an output of the GI inserter 1470 is input to the transceiver 1330 of FIG. 13.

In the detailed description of the present disclosure, a specific embodiment is described. However, the specific embodiment may be modified in various manners within the scope which is not departing from the scope of the present disclosure. Therefore, the scope of the present disclosure should not be determined limitedly to the embodiment described above but determined by the claims described below and the equivalents of the claims of the present disclosure.

What is claimed is:

1. A method for supporting time division duplex (TDD) in a wireless LAN system, comprising:
    transmitting, by a first wireless terminal, a first frame including a first information element defining a structure of TDD service period (SP) for a TDD channel access,
    wherein the structure of the TDD SP includes multiple TDD intervals which are consecutive and adjacent, and
    wherein each of the multiple TDD intervals includes one or more TDD slots; and
    transmitting, by the first wireless terminal, a second frame including a second information element defining a schedule for the TDD channel access of a second wireless terminal within the TDD SP to the second wireless terminal,
    wherein the second information element includes first information for defining an access type and a slot category of each of multiple TDD slots within the TDD SP and second information associated with a duration that takes effect of the second information element, and
    wherein the access type and the slot category of each of the multiple TDD slots within the TDD SP defined by the first information is repeated during the duration.

2. The method of claim 1, wherein the duration relates to a time period from a start of a first TDD interval for taking effect of the second information element to an end of a last TDD interval when the second information element is expired.

3. The method of claim 2, wherein the second information is configured as an integer multiple of the time period that relates to at least one TDD interval for the second wireless terminal within a TDD SP.

4. The method of claim 3, wherein the first information is repeated throughout a beacon interval related to the integer multiple, and
    wherein the beacon interval is a predetermined time interval between a beacon frame and a subsequent beacon frame.

5. The method of claim 1, wherein the second information element further includes third information for defining a type of frame permitted in the each of the multiple TDD slots for the second wireless terminal.

6. The method of claim 1, wherein the each of the multiple TDD slots is configured as one of a first type that permits a TX operation of the second wireless terminal, a second type that permits an RX operation of the second wireless terminal, a third type representing that a corresponding TDD slot is unassigned and a fourth type representing that a corresponding TDD slot is unavailable by the second wireless terminal.

7. The method of claim 1, wherein the first frame is a beacon frame periodically transmitted by an access point (AP),
    wherein the first information element is included in the beacon frame only when the structure of the TDD SP is changed, and
    wherein the second information element is transmitted with unicast technique within a beacon interval.

8. A first wireless terminal for performing a method for supporting time division duplex (TDD) in a wireless LAN system, the first wireless terminal comprising:
    a transceiver for transmitting or receiving a wireless signal; and
    a processor for controlling the transceiver, wherein the processor is configured to:
    transmit a first frame including a first information element defining a structure of TDD service period (SP) for a TDD channel access,
    wherein the structure of the TDD SP includes multiple TDD intervals which are consecutive and adjacent, and
    wherein each of the multiple TDD intervals includes one or more TDD slots; and
    transmit a second frame including a second information element defining a schedule for the TDD channel access of a second wireless terminal within the TDD SP to the second wireless terminal,
    wherein the second information element includes first information for defining an access type and a slot category of each of multiple TDD slots within the TDD SP and second information associated with a duration that takes effect of the second information element, and wherein the access type and the slot category of each of the multiple TDD slots within the TDD SP defined by the first information is repeated during the duration.

9. The wireless terminal of claim 8, wherein the duration relates to a time period from a start of a first TDD interval for taking effect of the second information element to an end of a last TDD interval when the second information element is expired.

10. The wireless terminal of claim 9, wherein the second information is configured as an integer multiple of the time period that relates to at least one TDD interval for the second wireless terminal within a TDD SP.

11. The wireless terminal of claim 10, wherein the first information is repeated throughout a beacon interval related to the integer multiple, and wherein the beacon interval is a predetermined time interval between a beacon frame and a subsequent beacon frame.

12. The wireless terminal of claim 8, wherein the each of the multiple TDD slots is configured as one of a first type that permits a TX operation of the second wireless terminal, a second type that permits an RX operation of the second wireless terminal, a third type representing that a corresponding TDD slot is unassigned and a fourth type representing that a corresponding TDD slot is unavailable by the second wireless terminal.

13. The wireless terminal of claim 8, wherein the first frame is a beacon frame periodically transmitted by an access point (AP), wherein the first information element is included in the beacon frame only when the structure of the TDD SP is changed, and wherein the second information element is transmitted with unicast technique within a beacon interval.

14. A method for supporting time division duplex (TDD) in a wireless LAN system, comprising:

receiving, by a first wireless terminal, a first frame including a first information element defining a structure of TDD service period (SP) for a TDD channel access, wherein the structure of the TDD SP includes multiple TDD intervals which are consecutive and adjacent, and wherein each of the multiple TDD intervals includes one or more TDD slots; and receiving, by the first wireless terminal, a second frame including a second information element defining a schedule for the TDD channel access of the first wireless terminal within the TDD SP from a second wireless terminal, wherein the second information element includes first information for defining an access type and a slot category of each of multiple TDD slots within the TDD SP and second information associated with a duration that takes effect of the second information element, and wherein the access type and the slot category of each of the multiple TDD slots within the TDD SP defined by the first information is repeated during the duration.

15. The method of claim 14, further comprising, by the first wireless terminal, configuring the structure of the TDD SP based on the first information element in a start time included in the first information element.

* * * * *